Nov. 29, 1949      B. CARLIN      2,489,860
APPARATUS FOR INSPECTING MATERIALS BY WAVE TRAINS
Filed Nov. 14, 1945      3 Sheets-Sheet 1

INVENTOR.
BENSON CARLIN
BY
Joseph H. Lipschutz
ATTORNEY

Nov. 29, 1949  B. CARLIN  2,489,860
APPARATUS FOR INSPECTING MATERIALS BY WAVE TRAINS
Filed Nov. 14, 1945  3 Sheets-Sheet 2
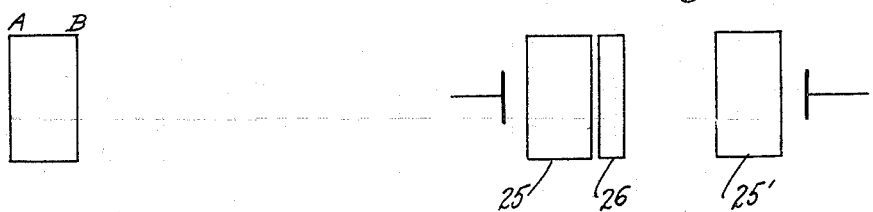
Fig.3A.
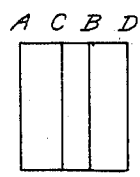
Fig.2A.
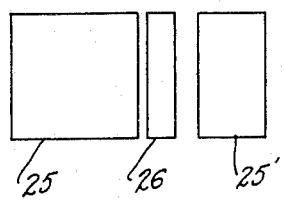
Fig.3B.
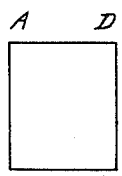
Fig.2B.
Fig.2C.
Fig.2D.
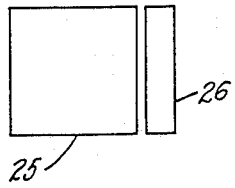
Fig.3C.
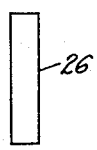
Fig.3D.
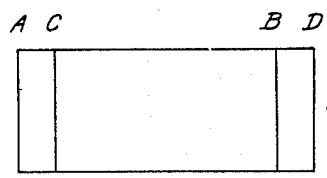
Fig.2E.
INVENTOR.
BENSON CARLIN
BY
Joseph H. Lipschutz
ATTORNEY

Patented Nov. 29, 1949

2,489,860

UNITED STATES PATENT OFFICE 2,489,860

APPARATUS FOR INSPECTING MATERIALS BY WAVE TRAINS

Benson Carlin, New York, N. Y., assignor to Sperry Products, Inc., Hoboken, N. J., a corporation of New York Application November 14, 1945, Serial No. 628,525

6 Claims. (Cl. 73—67)

This invention relates to means for testing materials by means of wave trains of radio, supersonic or other high frequency signals. One such method of testing is disclosed in the patent to F. A. Firestone No. 2,280,226, granted April 21, 1942, which discloses the method of sending wave trains into an article under test and measuring the time interval which elapses between the sending of the signal and receiving of the reflection from defects within the article. The transmitted pulse may be applied to the article by a piezo-electric crystal and the reflected pulse may be received either by the same crystal or another crystal and the output of the crystal may be impressed on the input of an amplifier. It is apparent that the amplifier will receive the transmitted pulse as well as the reflected pulse, and if a reflecting surface, such as a defect, lies close enough to the surface of the article under test, reflections from the defect will start coming back before the transmitted signal has been completed, and thus the received signal will be merged in the receiver amplifier in part with the transmitted pulse. If an oscilloscope is used as the indicating means for indicating the output from the amplifier, such defect close to the surface will appear on the oscilloscope merely as a broadening of the transmitted pulse. Since the width of the transmitted pulse varies within certain limits, it is frequently impossible to tell whether the pulse has been broadened by reason of reflections from a defect close to the surface. As a result, difficulty has been experienced in the detection of flaws lying close to the entering surface of the transmitted pulse, or in measuring the thickness of relatively thin strips of material where the reflection returns before the transmitted signal has ended.

The above difficulty applies to all cases where the defect or other desired reflecting surface lies sufficiently close to the entering surface so that the beginning of the reflection from the reflecting surface is received before the end of the transmission of the wave train. In such cases the defect will continue to reflect the transmitted wave train, and the reflection from the defect will continue for a time interval substantially equal to the time between the beginning of the wave train and the first reflection from the defect. In other words, if the wave train lasts for one microsecond and the defect is close enough to the surface so that the crystal receives the reflected wave train after .6 microsecond, the reflection from the defect will continue to be received by the crystal for .6 microsecond after the transmission of the wave train ends. However, it is apparent that the reflections from the defect have merged with the transmitted wave train, and will appear on the oscilloscope or other indicator merely as a broadening of the transmitted pulse, usually indistinguishable from the ordinary variations in the pulse.

It is therefore one of the principal objects of this invention to provide means for distinguishing between ordinary variations in pulse and the broadening of the pulse caused by the merging of reflections from a reflecting surface close to the entering surface of the transmitted pulse.

It is a further object of this invention to provide means for detecting defects, or indicating reflections from some other reflecting surface, where such defect or reflecting surface lies close to the surface where the transmitted pulse enters.

Heretofore it has been the practice in the detection of defects within an article to send pulses or wave trains periodically into the article and indicate the presence of defects by measuring the time interval between successive reflections. A time interval less than the time interval between a pulse and its reflection from a known reflecting surface which is usually the rear surface of the article, indicates the presence of a defect. It is one of the objects of this invention to provide a novel means for detecting the presence of fissures, which is independent of the time intervals between received pulses, but which gives an indication of the presence of a defect anywhere within the article. Such a system is highly useful where the relative position of the defect within the article is not material and it is only desired to know whether there is or is not a defect somewhere within the article under test.

It has been stated hereinbefore that in systems heretofore used there appeared on the indicator the transmitted pulse as well as reflections from the rear surface of the article and reflections from any intermediate reflecting surfaces such as a defect. It is another object of this invention to provide means whereby the reflections from the rear surface of the article may be eliminated and thus any reflection received after the transmitted pulse would necessarily be due to the presence of a defect. Such a system is particularly useful in the rapid testing of a large number of similar articles.

It is a further object of this invention to provide means for eliminating from the indicating means the indication caused by the transmitted pulse as well as the indication caused by the pulse reflected from the rear surface of the article, so that the only indications obtained are those caused by the presence of defects within the article. Such a system is highly desirable for the rapid testing of a large number of similar articles.

Further objects and advantages of this invention will become apparent in the following detailed description thereof.

In the accompanying drawings,

Figs. 2A, 2B, 2C, 2D and 2E are a series of diagrams illustrating the principle underlying this invention.

Figs. 3A, 3B, 3C, and 3D are a series of diagrams illustrating various forms of indications which may be obtained with this invention.

Figure 1:
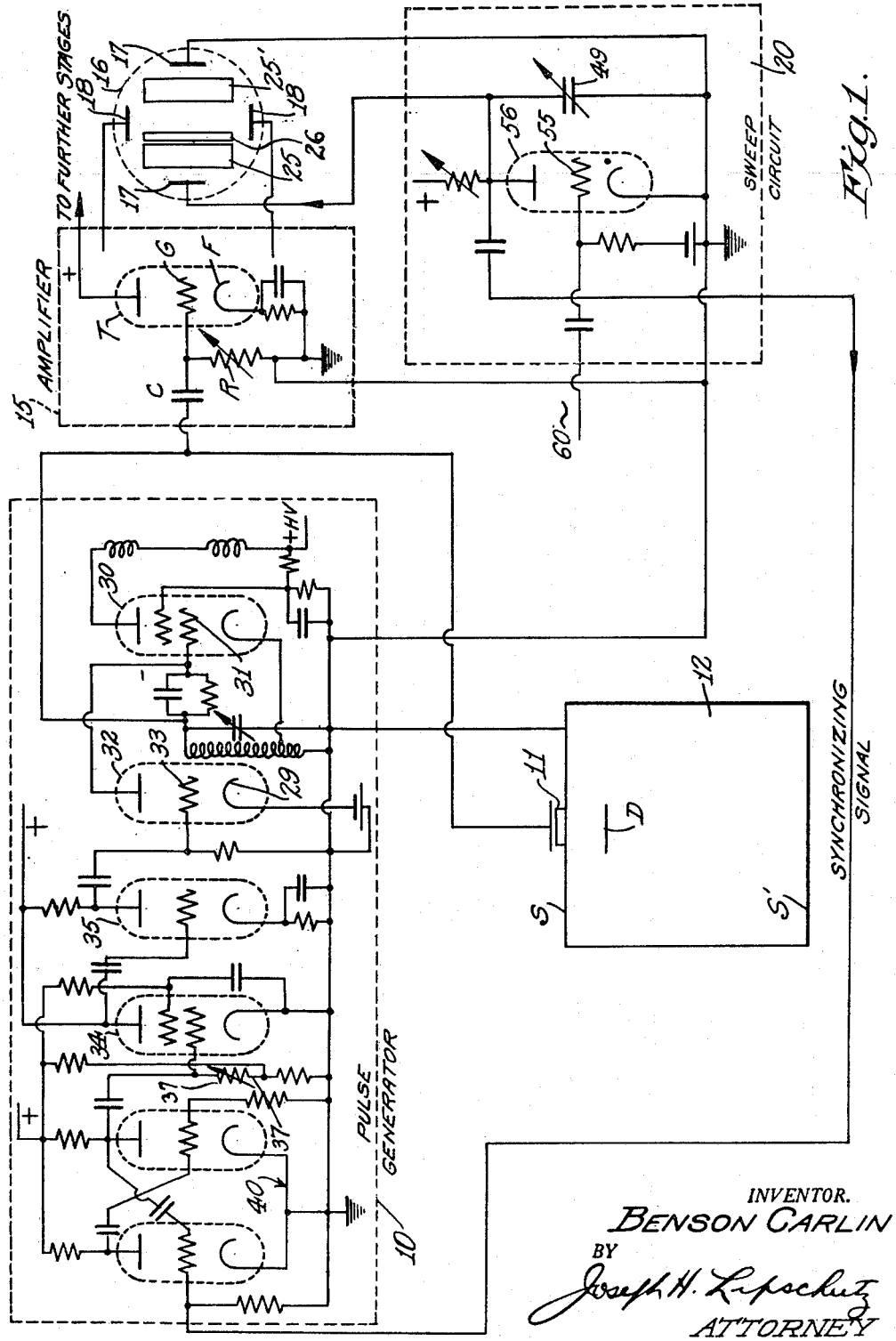
Fig. 1 is a wiring diagram illustrating one form of my invention.
Figure 4:
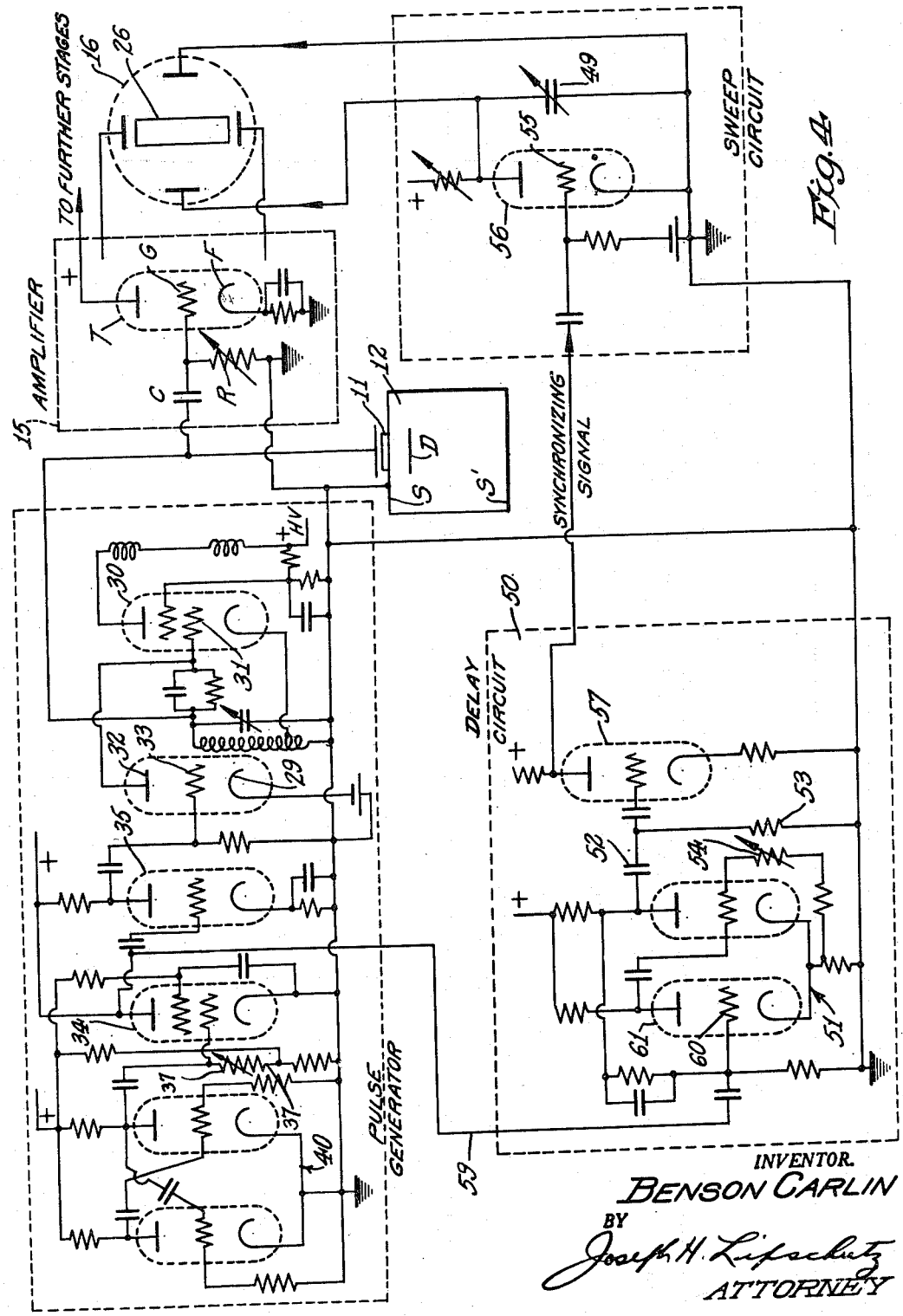

Fig. 4 is a wiring diagram similar to Fig. 1 of a modified form of invention.

Reference to Fig. 1 discloses my invention applied to a supersonic testing device wherein wave trains or pulses are periodically generated by a suitable pulse generator 10 which may be, for example, of the type disclosed in the said Firestone patent. Each pulse or wave train as it is generated is impressed upon a crystal 11 which is in engagement with a work piece 12 which it is desired to test for defects. The pulse will cause the crystal 11 to oscillate and send a train of mechanical vibrations through the work piece 12 from the upper or entering surface S through the block to the lower or reflecting surface S'. At the same time that the pulse is impressed on the crystal 11 it is also impressed on an amplifier 15 whose output may actuate any suitable indicator. In the Fig. 1 form the indicator is shown as an oscilloscope 16 having horizontal plates 17 and vertical plates 18. Across the horizontal plates 17 there may be impressed a sweep by a conventional sweep circuit 20, synchronized from any suitable source of alternating current such as a 60 cycle source so that 60 times each second a sweep will be started across the oscilloscope screen between plates 17. Preferably the sweep and pulse are synchronized either by a synchronizing signal from the sweep controlling the pulse generator or the generated pulse controlling the sweep. Such systems are well known and may be for example as shown in the copending patent application of F. A. Firestone, Serial No. 602,098, filed June 28, 1945.

The generated pulse which is impressed on the crystal 11 also actuates the indicator 16 where the output of the amplifier 15 impressed across plates 18 will cause a periodic vertical displacement of the sweep to generate a pulse shown at 25. As the pulse travels through the work piece 12 and strikes the surface S', it is reflected back to the crystal 11 where the mechanical vibrations generate voltages which are impressed on the amplifier whose output acting on plates 18 will cause an indication 25' on the sweep. The distance between 25 and 25' is a measurement of time which the pulse consumed in traveling through the work piece and back to the cyrstal and is therefore also a measurement of distance since it corresponds to twice the depth of the work piece. Should the pulse strike an intermediate reflecting surface, such as the fissure D, some of the pulse will be reflected by this surface back to the crystal before the pulse has been reflected from the surface S'. This will become evident by an indication 26 on the oscilloscope. The dis-tance of 26 from the beginning of pulse 25 is a function of the depth of the defect below the surface S.

Since the pulse requires a certain time in transmission as indicated by the width of the pulse mark 25, it becomes apparent that if a defect lies close enough to surface S it will start to reflect the pulse before the transmission of the pulse has terminated. Thus, referring to the diagrammatic representations in Fig. 2 it will be seen that the pulse 25 has a width AB as shown in Fig. 2A. The defect lying close to the surface will start reflecting before transmission of the pulse has terminated and will yield a reflection CD which overlaps AB. The result is as shown in Fig. 2C, namely, a broadening of the indication on the oscilloscope to AD. This broadening, as explained in the introduction hereto, is indefinite and frequently indistinguishable from the variations in the pulse proper so that it has heretofore been difficut and in some cases impossible to detect defects lying close to the surface of the work piece being tested.

In order to permit ready detection of such fissures lying close to the surface and which result merely in broadening the indication received from the pulse proper, I have devised a method and means whose result is indicated in Fig. 2D. The method consists in rendering the amplifier 15 unresponsive at the moment that the pulse ends. Thus at position B the amplifier is completely cut off. A fraction of a microsecond later the amplifier is again rendered responsive and it becomes apparent that any indication that comes through on the oscilloscope or other indicator must necessarily be due to the defect and corresponds to that portion of the response which is added to the pulse by the defect lying close to the surface. Thus ED represents the reflection from a defect and cannot be due to the pulse which is terminated at B. The time interval represented by BE is short relative to the time ED but is sufficient to cause a definite separation between the pulse AB and the succeeding reflection ED.

Reference to Fig. 1 discloses how I accomplish the result just described, namely, rendering the amplifier momentarily unresponsive when the pulse ends. The pulse generated by generator 10 is applied to the grid of G of the first tube T of amplifier 15 and since this pulse is of relatively high voltage it will place a very large negative D. C. bias on the grid because the grid G and the cathode F act as a diode rectifier as well as an amplifier tube. This large negative bias is in addition to the normal, relatively small permanent negative bias. The large oscillations of generator 10 are capable of modulating the total normal and additional bias to cause the tube T to pass current and produce the pulse 25, but as soon as the pulse has terminated, the large negative bias remains on grid G until such time as it is able to leak off to ground. The reflections returning to the crystal generate voltages which are capable of modulating the normal grid bias, but not the total normal and added bias, to cause the tube to pass current. Heretofore the goal which was sought was the maximum speed of recovery of the amplifier and hence the quickest possible leakage of the additional negative bias off grid C, so that reflections from defect D could come through as soon as the pulse ended. The result of such instantaneous recovery, however, was the merging of the reflections from defect D lying close to the surface with the pulse to give the broadening effect shown in Fig. 2C In contrast to such previous practice, I provide a time constant in the grid circuit between the grid G, pulse generator 10, and ground, consisting of capacity C and resistor R either one or both of which may be variable and so selected that instead of amplifier 15 recovering instantaneously there is purposely provided a time lag following the cessation of the pulse during which the amplifier is unresponsive to reflections from defect D. This provides the interval BE of Fig. 2D. Thus for the interval BE there is still sufficient negative bias on grid G to maintain tube T in cutoff position with respect to the voltages generated in the crystal by the reflections, and it is only after the interval of time represented by BE that the negative bias of grid G has been reduced to the point where the reflections from defect D generating voltages in crystal 11 can modulate the grid bias to cause tube T to pass current and thus appear as the indication 26 distinct from the pulse indication 25.

From Fig. 2B it is apparent that no matter how wide the pulse AB may be made the reflection CD is equal to it and therefore the duration of the reflection BD after the pulse AB has terminated will always be equal to the interval AC required for the pulse to reach the defect and return to the surface S. Thus, for instance, reference to Fig. 2E indicates that although pulse AB has been greatly increased in length the distance BD still remains equal to AC. Therefore, by cutting off the amplifier at the end B of the pulse and turning it on again after a brief interval the reflection ED will come through to the same extent no matter how long pulse AB may be.

Advantage is taken of the above fact to position the defect indication 26 at any desired point on the oscilloscope screen. Thus, for example, reference to Figs. 3A and 3B illustrates how the reflection 26 may be positioned as desired on the screen by varying the width of the pulse 25. The means for accomplishing this purpose will be found in the pulse generator 10 shown in Fig. 1. This pulse generator includes an oscillatory circuit having an oscillator tube 30 upon whose control grid 31 there is normally placed a relatively large negative bias by a trigger tube 32 which is normally conducting. The cathode 29 of the trigger tube has a large negative voltage thereon so that while the tube is conducting it will place a large negative bias on the grid of the oscillator tube. To transmit a pulse, a square wave generator 40 is shown, and the square wave after passing through an amplifier tube 34 and an inverter tube 35, is designed to place a bias on the grid 33 of the trigger tube 32 sufficient to render the trigger tube non-conducting, thus reducing the negative bias on the grid of the oscillator tube and allowing the oscillator to oscillate to produce the desired pulse. The duration of the pulse is a function of the length of the square wave which can be adjusted at will by the variable potentiometer 37. Thus by varying this potentiometer, the width of pulse 25 may be varied to bring the indication 26 in any desired position on the oscilloscope.

As shown in Figs. 1, 3A and 3B the oscilloscope shows the indication 25 corresponding to pulse AB, the indication 26 corresponding to the portion ED of the reflection from the defect, and the indication 25' corresponding to the reflection of the transmitted pulse from the surface S' of the workpiece. If the indication 25' could be eliminated, then any reflections on the oscilloscope screen after the indication 25 would be due to reflection from a defect and thus would be more readily readable and detectable. The means for accomplishing this result is disclosed in Fig. 1 and consists in a variable condenser 49 in the sweep circuit 20 which will vary the length of sweep. This length is chosen so that the sweep ends just before the transmitted pulse reaches the surface S' and therefore no reflection from the surface S' will be obtained. The oscilloscope screen will then appear as in Fig. 3C.

As a further aid in obtaining a more readily readable indication and therefore a condition in which defects may be more readily detected it would be desirable to eliminate from the screen the indication 25 corresponding to the transmitted pulse. For this purpose the arrangement disclosed in Fig. 4 may be used. In this arrangement a delay circuit 50 is interposed between the pulse generator and the sweep so that the sweep does not become effective until the end of the pulse. Such a delay circuit may comprise a square wave generator 51 to generate a square wave which is passed through a rate differentiator circuit 52, 53 which will give outputs at the beginning and end of the square wave, these outputs being in opposite directions. The distance between these outputs may be varied by varying the potentiometer 54 in the square wave generator circuit. The output from the rate differentiator circuit corresponding to the end of the square wave is caused to energize the sweep circuit by placing the proper bias on the grid 55 of the sweep circuit tube 56 to cause the gas tube to discharge. To obtain the proper polarity for the output from the rate differentiator circuit corresponding to the end of the pulse these outputs must be put through an inverter tube 57. It will now be seen that by varying the potentiometer 54 of the square wave generator circuit the rear end of the wave may be moved nearer or further from the front end and the output from the rate differentiator circuit corresponding to the rear end of the square wave is utilized to trigger the sweep. The time when the sweep becomes effective may be varied to correspond to the end of the pulse. To obtain this synchronism the square wave generator is started by the bias on the oscillator tube grid 31 so that the square wave is generated when the oscillator starts oscillating. Since the bias on grid 31 is supplied from the square wave generator 40 and amplifier tube 34, a connection 59 extends from the output of tube 34 to the grid 60 of the input tube 61 of the delay circuit multivibrator 51. Since the sweep begins only when the pulse has ended it is obvious that no indication will be obtained on the oscilloscope corresponding to the transmitted pulse and, since the length of sweep is chosen to eliminate the indication 25' due to the reflection of the transmitted pulse, only the indication 26 will appear on the oscilloscope as shown in Fig. 3D.

The foregoing description of the invention is merely illustrative and changes may be made within the scope of the appended claims.

Having described my invention, what I claim and desire to secure by Letters Patent is:

1. In a device for testing material, means for generating a pulse, means for transmitting the pulse into the material and for receiving reflections, a receiver actuated by said transmitting and receiving means, an indicator actuated by the receiver, and means for detecting defects in the material lying close enough to the surface through which the pulse is transmitted so that the reflection of the transmitted pulse begins to be received before the transmission of the pulse has ended, said last-named means comprising means for rendering the receiver ineffective when the transmitted pulse ends, and means for rendering the receiver again effective after a predetermined interval of time.

2. In a device for testing material, means for generating a pulse, means for transmitting the pulse into the material and for receiving reflections therefrom, a receiver actuated by said transmitting and receiving means, an indicator actuated by said receiver, said receiver including a thermionic tube having an input grid, means for normally biasing the grid, means whereby the transmission of the pulse places an additional bias on the grid, the reflected pulse being capable of modulating the grid bias to cause the tube to pass current when the grid has the normal but not the additional bias thereon, and means for detecting defects in the material lying close enough to the surface through which the pulse is transmitted so that the reflections of the transmitted pulse begin to be received before the transmission of the pulse has ended, said last-named means comprising a time constant in the grid circuit for causing the additional grid bias to discharge in a predetermined time interval after the transmission of the pulse has ended.

3. In a device for testing material, means for generating a pulse, means for transmitting the pulse into the material and for receiving reflections therefrom, a receiver actuated by said transmitting and receiving means, an indicator actuated by said receiver, said receiver including a thermionic tube having an input grid, means for normally biasing the grid, means whereby the transmission of the pulse places an additional bias on the grid, the transmitted pulse being capable of modulating the total normal and additional grid bias to cause the tube to pass current, the reflected pulse being capable of modulating the grid bias to cause the tube to pass current when the grid has the normal but not the additional bias thereon, and means for detecting defects in the material lying close enough to the surface through which the pulse is transmitted so that the reflections of the transmitted pulse begin to be received before the transmission of the pulse has ended, said last-named means comprising a time constant in the grid circuit for causing the additional grid bias to discharge in a predetermined time interval after the transmission of the pulse has ended.

4. In testing material by generating a pulse, transmitting the pulse into the material, receiving the transmitted pulse and its reflections at a receiver and indicating the output from the receiver on an oscilloscope having a sweep circuit, means for detecting defects in the material lying close enough to the surface through which the pulse is transmitted so that the reflection of the transmitted pulse from the defect begins to be received before the transmission of the pulse has ended, said means comprising means for rendering the receiver ineffective when the transmission of the pulse ends, means for rendering the receiver again effective after a predetermined interval of time of sufficient duration to cause a separation between the indications corresponding to the transmitted pulse and the succeeding reflections, and means for varying the length of the pulse to bring the indication of the succeeding reflections into a predetermined position on the oscilloscope.

5. In testing material by generating a pulse, transmitting the pulse into the material, receiving the transmitted pulse and its reflections at a receiver and indicating the output from the receiver, means for detecting defects in the material lying close enough to the surface through which the pulse is transmitted so that the reflection of the transmitted pulse from the defect begins to be received before the transmission of the pulse has ended, said means comprising means for rendering the receiver ineffective when the transmission of the pulse ends, means for rendering the receiver again effective after a predetermined interval of time, means for indicating the output from the receiver and means for terminating the indication of the output prior to the reception of the reflected pulse from the opposite surface of the material.

6. In a device for testing material, means for generating a pulse, means for transmitting the pulse into the material and for receiving reflections therefrom, a receiver actuated by said transmitting and receiving means, an indicator comprising a cathode ray tube, a sweep circuit for imparting a sweep to the tube, means whereby the output from the receiver deflects the sweep, means for rendering the indicator ineffective during the transmission of the pulse and rendering the indicator again effective when the pulse ends, said last-named means comprising a delay circuit, and means whereby the delay circuit controls the sweep circuit to delay the sweep, and means for rendering the indicator ineffective prior to the reception of the reflected pulse from the opposite surface of the material, said last-named means comprising means for varying the length of the sweep.

BENSON CARLIN.

REFERENCES CITED

The following references are of record in the file of this patent:

UNITED STATES PATENTS

| Number | Name | Date |
|---|---|---|
| 1,902,183 | Rieber | Mar. 21, 1933 |
| 2,280,226 | Firestone | Apr. 21, 1942 |
| 2,426,989 | Rosa | Sept. 9, 1947 |
| 2,435,960 | Fyler | Feb. 17, 1948 |